(12) United States Patent
Dodge

(10) Patent No.: US 7,707,480 B2
(45) Date of Patent: Apr. 27, 2010

(54) SYSTEM EMPLOYING DATA VERIFICATION OPERATIONS OF DIFFERING COMPUTATIONAL COSTS

(75) Inventor: Dan Dodge, Nepean (CA)

(73) Assignee: QNX Software Systems GmbH & Co. KG, Karlsbad (DE)

( * ) Notice: Subject to any disclaimer, the term of this patent is extended or adjusted under 35 U.S.C. 154(b) by 870 days.

(21) Appl. No.: 11/477,824

(22) Filed: Jun. 28, 2006

(65) Prior Publication Data

US 2007/0113120 A1 May 17, 2007

Related U.S. Application Data

(60) Provisional application No. 60/696,493, filed on Jul. 1, 2005.

(51) Int. Cl.
*H03M 13/00* (2006.01)
(52) U.S. Cl. .................... 714/758; 702/189
(58) Field of Classification Search ............. 714/758; 702/189; 379/399.02
See application file for complete search history.

(56) References Cited

U.S. PATENT DOCUMENTS

| | | | |
|---|---|---|---|
| 4,926,317 A | 5/1990 | Wallach et al. | |
| 4,945,475 A | 7/1990 | Bruffey et al. | |
| 5,187,786 A | 2/1993 | Densmore et al. | |
| 5,455,944 A | 10/1995 | Haderle et al. | |
| 5,530,849 A | 6/1996 | Hanushevsky et al. | |
| 6,058,400 A | 5/2000 | Slaughter | |
| 6,292,808 B1 | 9/2001 | Obermarck et al. | |
| 6,367,047 B1 * | 4/2002 | McAuliffe et al. | 714/755 |
| 6,571,259 B1 | 5/2003 | Zheng et al. | |
| 6,591,376 B1 | 7/2003 | VanRooven et al. | |
| 6,606,628 B1 | 8/2003 | Monsen et al. | |
| 6,748,491 B2 | 6/2004 | Rodriguez | |
| 6,754,696 B1 | 6/2004 | Kamath et al. | |

(Continued)

FOREIGN PATENT DOCUMENTS

JP 62-186361 A 8/1987

(Continued)

OTHER PUBLICATIONS

Cárdenas, Alfonso F. "Analysis and Performance of Inverted Data Base Structures." IBM Research Laboratory, San Jose, Communication of ACM May 1975, vol. 18, No. 5, pp. 253-263.

(Continued)

*Primary Examiner*—Guy J Lamarre
(74) *Attorney, Agent, or Firm*—Brinks Hofer Gilson & Lione

(57) ABSTRACT

A computer system having an optimized system for data integrity verification is disclosed. The computer system includes a processor and memory storage that is accessible by the processor. The memory storage includes stored data that is subject to data verification. The system also includes data verification software that is executable by the processor to verify the integrity of the stored data. The data verification software is executable to conduct a first integrity check on a given set of stored data and, if an error is detected, to conduct a second integrity check on the given set of stored data. The second integrity check may have a larger computational cost than the first integrity check thereby increasing the overall efficiency and response time of the system to data verification events.

38 Claims, 9 Drawing Sheets

U.S. PATENT DOCUMENTS

| | | |
|---|---|---|
| 6,845,401 B1 | 1/2005 | Papadopoulos et al. |
| 6,856,993 B1 | 2/2005 | Verma et al. |
| 7,047,257 B2 | 5/2006 | Fletcher et al. |
| 7,139,752 B2 | 11/2006 | Broder et al. |
| 7,181,463 B2 | 2/2007 | Moore et al. |
| 7,191,185 B2 | 3/2007 | Dweck et al. |
| 2002/0174295 A1 | 11/2002 | Ulrich et al. |
| 2005/0055621 A1* | 3/2005 | Adelmann et al. .......... 714/758 |
| 2005/0149525 A1 | 7/2005 | Verma et al. |
| 2007/0005560 A1 | 1/2007 | Dodge |
| 2007/0005614 A1 | 1/2007 | Dodge |
| 2007/0005615 A1 | 1/2007 | Dodge |
| 2007/0005627 A1 | 1/2007 | Dodge |
| 2007/0005874 A1 | 1/2007 | Dodge |
| 2007/0005894 A1 | 1/2007 | Dodge |

FOREIGN PATENT DOCUMENTS

| | | |
|---|---|---|
| JP | 06-139124 A | 5/1994 |

OTHER PUBLICATIONS

Colyer, A. M. "Displaying and Manipulating Relationships." IBM Technical Disclosure Bulletin, Dec. 1995, vol. 38, Issue No. 12, pp. 391-396.

QNX Software Systems, "Embedded transaction filesystem (ETFS)," *System Architecture*, 2004, pp. 193-198.

* cited by examiner

SYSTEM EMPLOYING DATA VERIFICATION OPERATIONS OF DIFFERING COMPUTATIONAL COSTS

CROSS-REFERENCE TO RELATED APPLICATIONS

The present application claims priority to U.S. provisional patent application Ser. No. 60/696,493, filed Jul. 1, 2005, which is incorporated herein by reference.

BACKGROUND OF THE INVENTION

1. Technical Field

The present invention is generally directed to a data verification system for use in a computer system such as an embedded controller, or the like. More particularly, the invention is directed to a system that may quickly verify data integrity using multiple data verification operations, where the data verification operations may have differing computational costs.

2. Related Art

Computers, embedded controllers, and other microprocessor based devices typically employ one or more memory storage units that are used for the reading and writing of data used in the overall system. The memory storage may take on a variety of different forms including, but not limited to, hard disk drives, floppy disk drives, integrated circuit memory, etc.

In each device, some manner of controlling the reading and writing of data to and from the memory storage units is often necessary. To this end, each device may include an operating system that acts as an interface between the high-level application programs executed by the processor and the system hardware, such as the memory storage units. File system software may be included in the operating system, or it may be provided as an ancillary software component that interacts with the operating system. In either instance, the file system software may be used to organize the data within the memory storage units for ready access by the processor.

Data verification software also may be provided for checking and/or maintaining the integrity of the data within the file system. In many systems, the data verification software verifies the integrity of the data each time it is read from the memory storage unit(s) as well as each time it is stored on the memory storage unit(s). The data verification software may use a single data verification method, such as an Error Correcting Code (ECC) method, during each verification. In accordance with this method, a coding function known as the ECC coding function is used to generate an ECC code in connection with the data as it is stored during a write operation. The generated ECC code is stored along with the data for subsequent verification during a read operation. During a read operation, the ECC coding function is again applied to the data and the newly generated ECC code is compared to the ECC code stored with the data during the prior write operation. If the ECC codes differ from one another, the data has been corrupted. Depending on the degree of corruption, either or both of the ECC codes may be used to correct the errors in the data.

While ECC techniques are effective for correcting single bit errors or double bit errors, they can be computationally expensive to implement, particularly when the ECC code generation takes place during every read and write operation. The integrity of the entire data of the file system also may be verified during system start up, leading to substantially delayed boot times when ECC techniques are employed. This problem is further exacerbated when more sophisticated coding functions allowing for correction of multi-bit errors are employed. Accordingly, an alternative to the existing data integrity verification operations is needed.

SUMMARY

A computer system having an optimized system for data integrity verification is disclosed. The computer system includes a processor and memory storage that is accessible by the processor. The memory storage includes stored data that is subject to data verification. The system also includes data verification software that is executable by the processor to verify the integrity of the stored data. The data verification software is executable to conduct a first integrity check on a given set of stored data and, if an error is detected, to conduct a second integrity check on the given set of stored data. The second integrity check may have a larger computational cost than the first integrity check thereby increasing the overall efficiency and response time of the system to data verification events.

The computer system may be implemented in a variety of different manners. For example, the first integrity check may comprise a cyclic redundancy check while the second integrity check comprises an error correcting code check, where one or more correctable errors in the given set of stored data error are fixed through execution of the error correcting code check. The computer system also may include file system software that is executable by the processor to organize the stored data as a plurality of transaction records.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
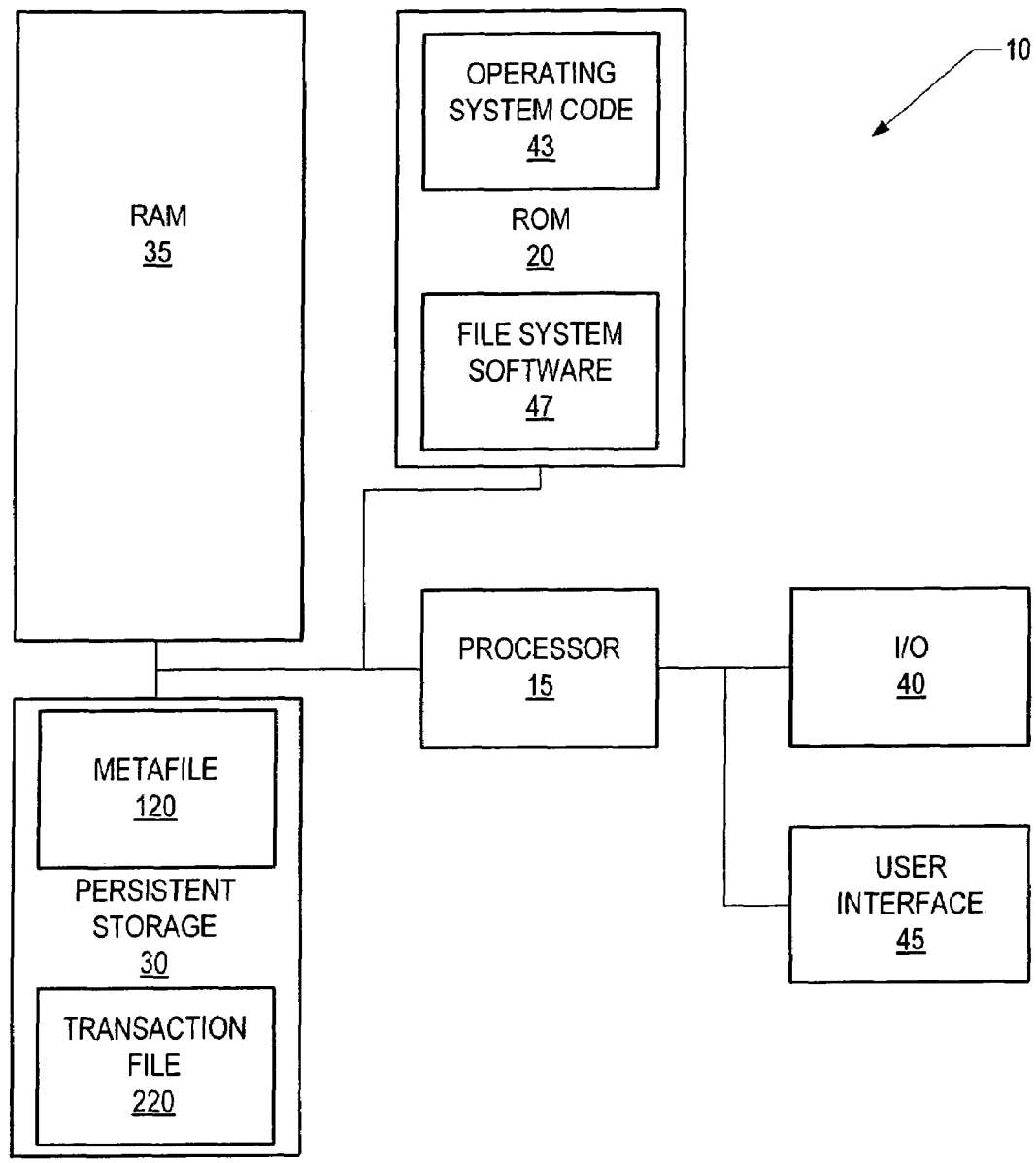
FIG. 1 is a block diagram illustrating the components of an exemplary computer system.

FIG. 1 illustrates the components that may be employed in an exemplary computer system 100. As shown, the exemplary system 100 includes a processor 105, read only memory 110, and general memory storage 115. Computer system 100 also may include random access memory 120, an I/O interface 125, and a user interface 130. The particular components that are used in computer system 100 are tailored to the particular function(s) that are to be executed by the computer system 100. Accordingly, the presence or absence of a component, other than processor 105, may be specific to the design criterion imposed on the computer system 10. For example, user interface 130 may be omitted when the computer system 100 is to take the form of an embedded controller or the like.

Read only memory 110 may include operating system code 135 that controls the interaction between high-level application programs executed by the processor 105 and the various hardware components, including memory devices 110 and 120, the general memory storage 115, and the interface devices 125 and 130. The operating system code 135 may include file system software 140 for organizing and controlling access to files stored on the general memory storage 115. Alternatively, the file system software 140 may be provided as a separate software component that merely interacts with the operating system code 135. In such instances, the code corresponding to the file system software may be stored in read only memory 110, general memory storage 115 or the like. When the computer system 100 is networked with other computers and/or storage devices through I/O interface 125, the file system software 140 may be stored remotely and downloaded to computer system 100 as needed. FIG. 1 illustrates storage of the file system software 140 in read only memory 110.

The general memory storage 115 may take on any number of different forms. For example, the general memory storage 115 may take the form of a hard disc drive, floppy disk drive, etc. It also may be in the form of a non-rotating media device, such as non-volatile memory implemented in an integrated circuit format (i.e., flash memory, etc.). Still further, general memory storage 115 need not be limited to a single memory structure. Rather, the general memory storage 115 may include a number of separate storage devices of the same type (i.e., all flash memory) and/or separate storage devices of different types (i.e., one or more flash memory units and one or more hard disk drives).

The files stored in the general memory storage 115 include data that is interpreted in accordance with a predetermined format implemented in an application program using the data stored in the file. Accordingly, the data stored within a given file may constitute the software code of an executable program, ASCII text of a database record, data corresponding to transactions executed (or not executed) by computer system 10, etc.

The file system software 140 organizes the files stored on the general memory storage 115. For example, the file system 140 may be employed in as a transactional or log-based file system. In this transactional system, a transaction file 145 is maintained in the general memory storage 115. The transaction file 145 may be used to keep records of the transactions associated with each file and directory of the general memory storage 115. Updates to the general memory storage 115 are committed atomically based on the transaction records contained in transaction file 145. In one of its simplest form, every transaction record may be stored in a single logical page that is mapped to a physical block or sector of the general memory storage 115.

Figure 3:
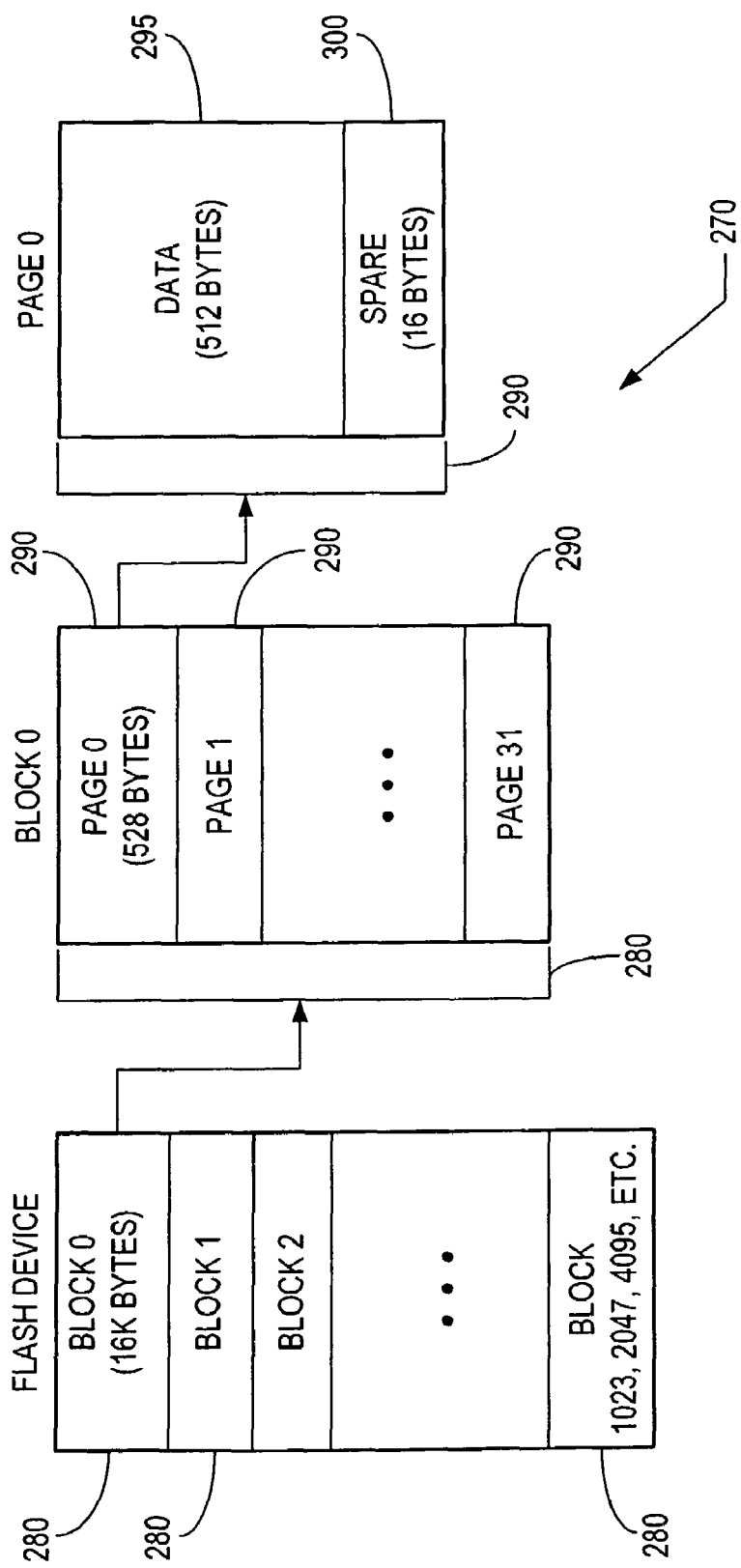
FIG. 3 is a block diagram of the logical architecture of one type of NAND flash memory device.

One manner in which a transaction record 225 may be formatted for use in computer system 10 is shown in FIG. 3. Generally stated, transaction record 225 includes a header field 230 and a corresponding data field 235. The header field 230 may include a number of different sub-fields. The sub-fields shown in FIG. 3 include a transaction sequence field 240, a file identification field 245, a transaction status field 250, a cluster high field 255, a cluster low field 260 and number of clusters field 265.

Each of the sub-fields of header field 230 has a meaning to the file system software 140. In this example, the transaction sequence field 240 is a monotonically increasing transaction identifier that is assigned by the file system software 140. When a new transaction record is added to the transaction file 145, the value stored in the transaction sequence field 240 of the new record may be increased by a predetermined amount over the value of the transaction sequence field of the preceding transaction record. Consequently, transaction records having larger transaction identifier values are considered to have been added to the transaction file 145 later in time than transaction records having lower transaction identifier values. This chronological sequencing of the transactions as represented by the value of the transaction sequence field 240 (and, in certain circumstances, the position of the transaction record within a logical block of the transaction file 145) allows the file system software 140 to apply (i.e., commit) the transactions in the proper order to maintain the integrity of the file system contents. Other ways of keeping track of the chronological sequencing of the transactions also may be used.

File system software 140 uses the transaction status field 250 to determine whether the transaction of the transaction record 225 has been committed. Once a transaction has been committed, further alteration of the committed transaction record 225 may be inhibited. This ensures consistency of the file system and also allows the file system to store the transaction file in, for example, write-once media, flash media, or the like.

The file identification field 245 identifies which file is affected by the transaction referenced in the transaction record 225. In most instances, the file identification field 245 is in the same format as the file record identifiers used in connection with metafile 120. The cluster high field 255 and cluster low field 260 are used by the file system software 140 to determine the starting address (or offset) at which the data 235 is to be written into the identified file while the number of clusters field 265 is used to determine how many clusters of the identified are to be overwritten by the data 235.

As noted above, general memory storage 115 may include one or more a flash memory devices. Flash memory devices store information in logic gates, called "memory cells," each of which typically stores one bit of information. More recent advances in flash memory technology have also enabled such devices to store more than 1 bit per cell, sometimes referred to as multi-level cell devices. Additionally, flash memory is non-volatile, which means that the contents of memory cells are not lost when power is withdrawn from the device.

Although such flash device technology is constantly evolving, dominant technologies include NAND flash memory and NOR flash memory. NOR flash devices and NAND flash devices generally differ in the type of logic gate used for each storage cell. An exemplary logical architecture 300 of one type of NAND flash memory device 305 is shown in FIG. 3. As illustrated, the available memory on the device 305 is organized into contiguous physical blocks 310 each having an equal number of memory cells (i.e., 16K bytes). NAND flash memory device 305 further divides each of the contiguous blocks 310 into a specific number of physical sectors or pages 315. Each physical page 290, in turn, is further divided into a data area 320 and spare area 325. The data area 320 may be reserved for storage of data, while the spare area 325 may be reserved for maintenance of meta-information about the data stored in data area 320. The meta-information may include, for example, error-correcting codes used for verification and correction of sector contents, cyclic redundancy check data, etc.

The data area 320 and spare area 325 may be set to specific sizes. For example, each page 315 of the exemplary NAND flash device 305 of FIG. 4 includes a data area 320 of 512 bytes and a spare area 325 of 16 bytes for a total page size of 528 bytes. In this example, the NAND flash device 305 also employs 32 pages 315 per block 310. Alternatively, other page sizes may be used. For example, such NAND devices may include blocks having 64 pages where each page includes 2112 bytes such that the data area 320 is 2048 bytes and the spare area 325 is 64 bytes.

Figure 2:
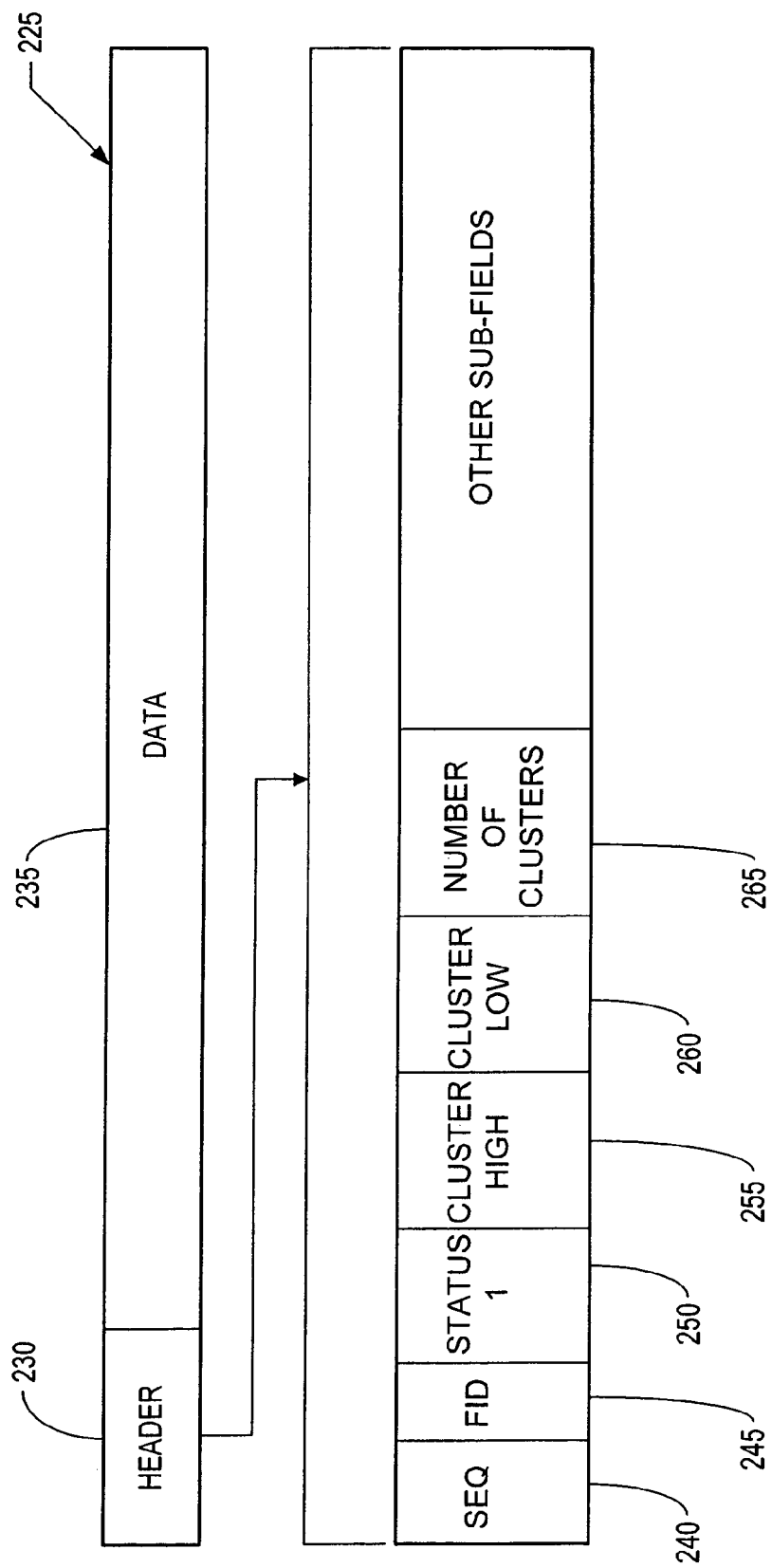
FIG. 2 is a block diagram illustrating one exemplary manner of formatting data records in the system of FIG. 1.
Figure 4:
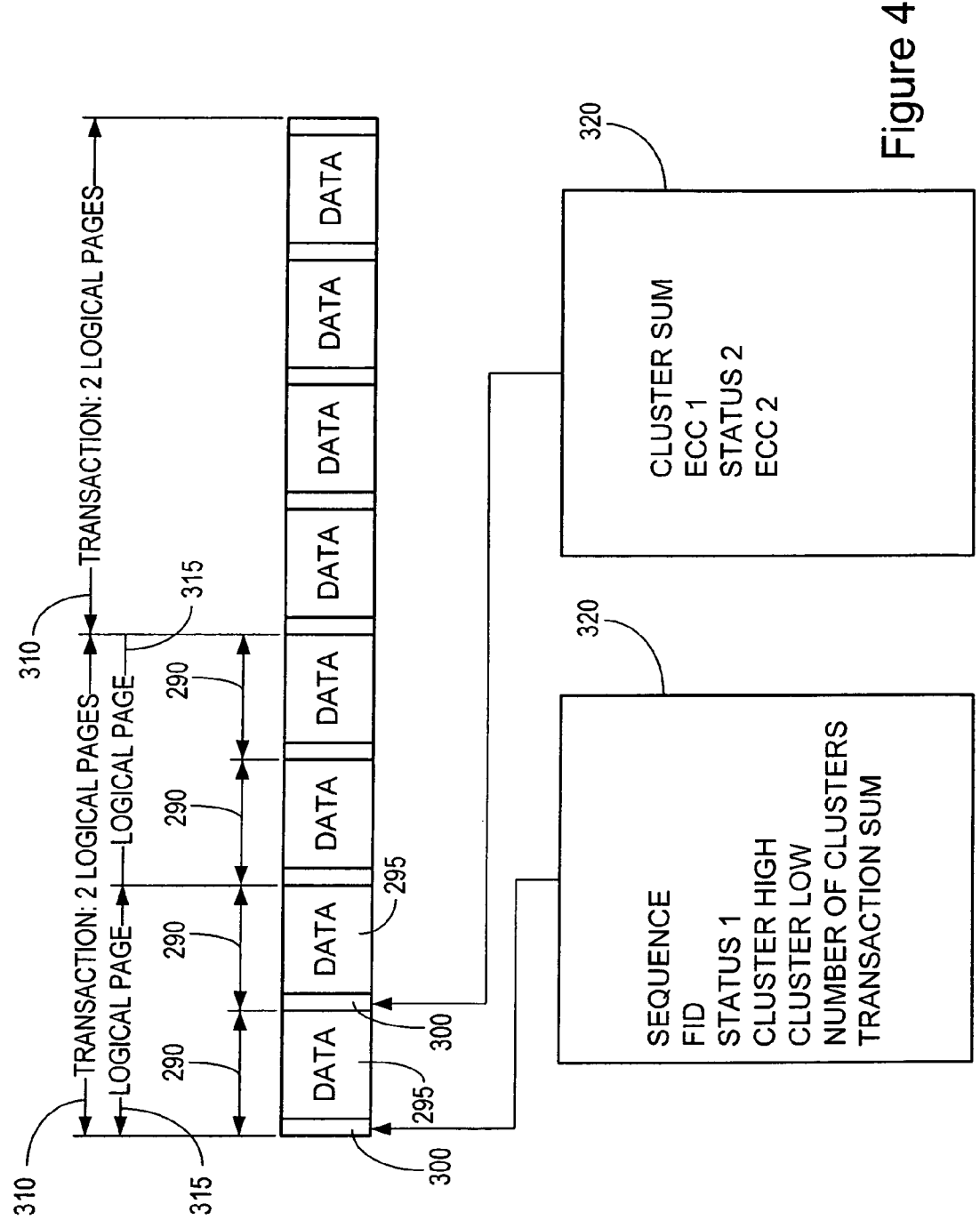
FIG. 4 is a block diagram of the logical organization of exemplary transaction records that may be stored in a flash memory device of the type shown in FIG. 3.

FIG. 4 illustrates one manner in which transaction records may be organized in a flash memory device such as NAND flash device 305. In this example, each transaction record 400 may be comprised of two contiguous logical pages 405. Each logical page 405, in turn, may be comprised of two contiguous physical pages 315 of a block 310 of device 305. Meta-data information relating to the transaction record 400 is stored in spare area 325, and may include some of the basic fields described in connection with header 230 of FIG. 2. Depending on the size of the spare area 325 of each page 315, the meta-data information 425 may be divided among multiple spare areas 325 of the transaction record 400. A division of the meta-data information between the spare areas 325 of two consecutive physical pages 315 is shown in FIG. 4.

Figure 5:
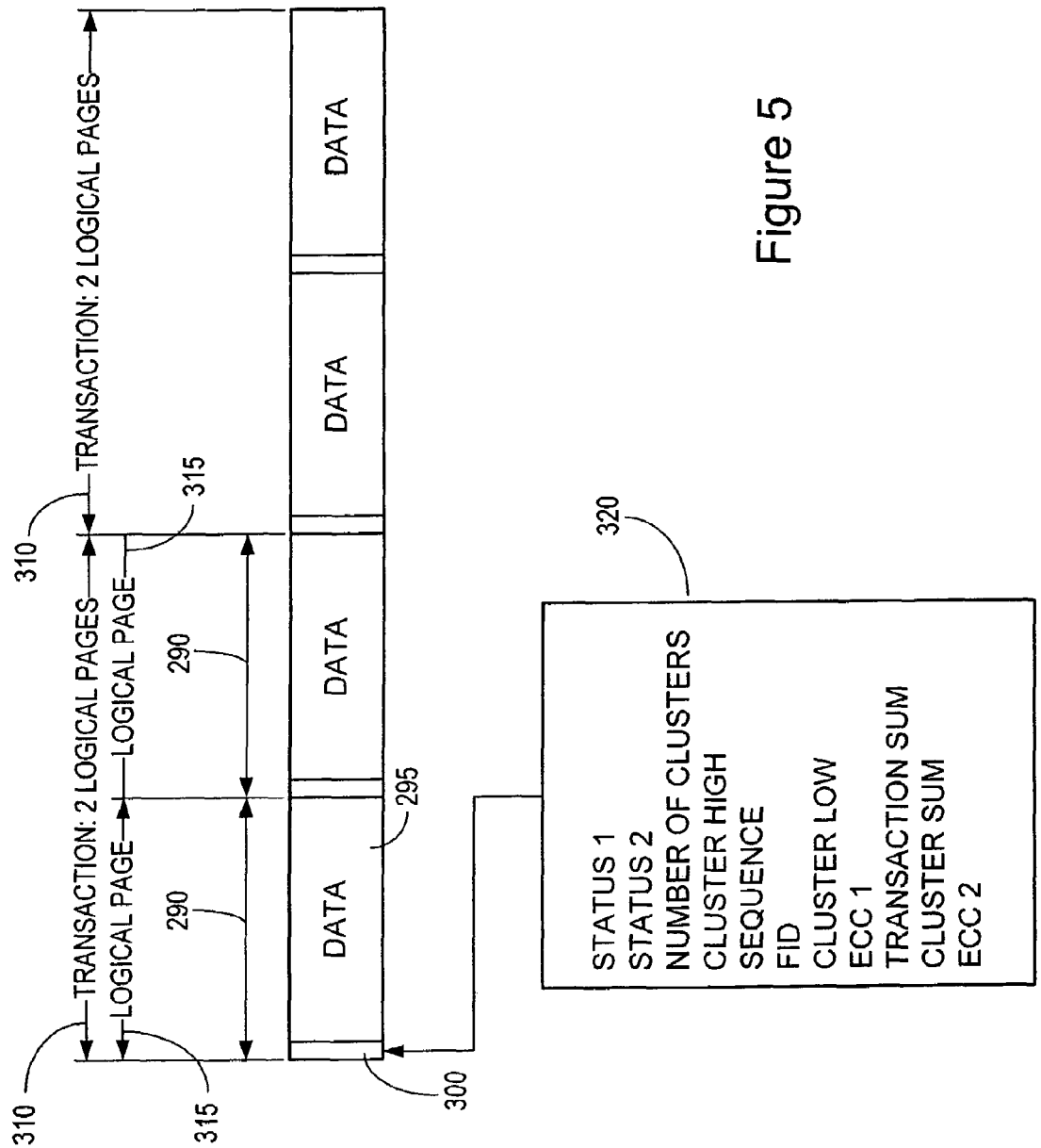
FIG. 5 is a block diagram illustrating a further exemplary manner in which transaction records may be organized in a flash memory device.

An alternative arrangement showing transaction records 500, in which there is a one-to-one correspondence between each logical page 315 and a physical page 505 of flash device 305, is shown in FIG. 5. In this arrangement, all of the meta-data information 520 is stored in the spare area 325 of the first physical page 315 of the transaction 500. Arrangements of this type are particularly suitable when large capacity flash devices are employed.

When using the arrangements for the transaction records shown in FIGS. 4 and 5, the sequence identifiers for each transaction record stored in a given device block 310 may have the same values. In such instances, the sequence identifier provides chronological information on the transaction records within a given block with respect to other device blocks. Chronological information pertaining to the transaction records 310 stored in a given block can be determined by the offset location of the transaction record 310 within the block 290, with later occurring transaction records 310 occurring at larger offsets in the block 290.

Data integrity maintenance of the records of the file system may be integrated into the system 100 to ensure that it operates properly and consistently. To this end, the integrity of the data 235 and/or header 230 in the transaction 225 may be checked prior to, during, or after the execution of various read and write operations. Further, data integrity may be checked during system startup. In the illustrated system, data integrity may be checked by data verification software that is executable by the processor 105. The data verification software may be stored in ROM 110 as a separate software component, as part of the operating system code 135, or as part of the file system software 140. Alternatively, the operations of the data verification software may be distributed amongst various software components.

Figure 6:
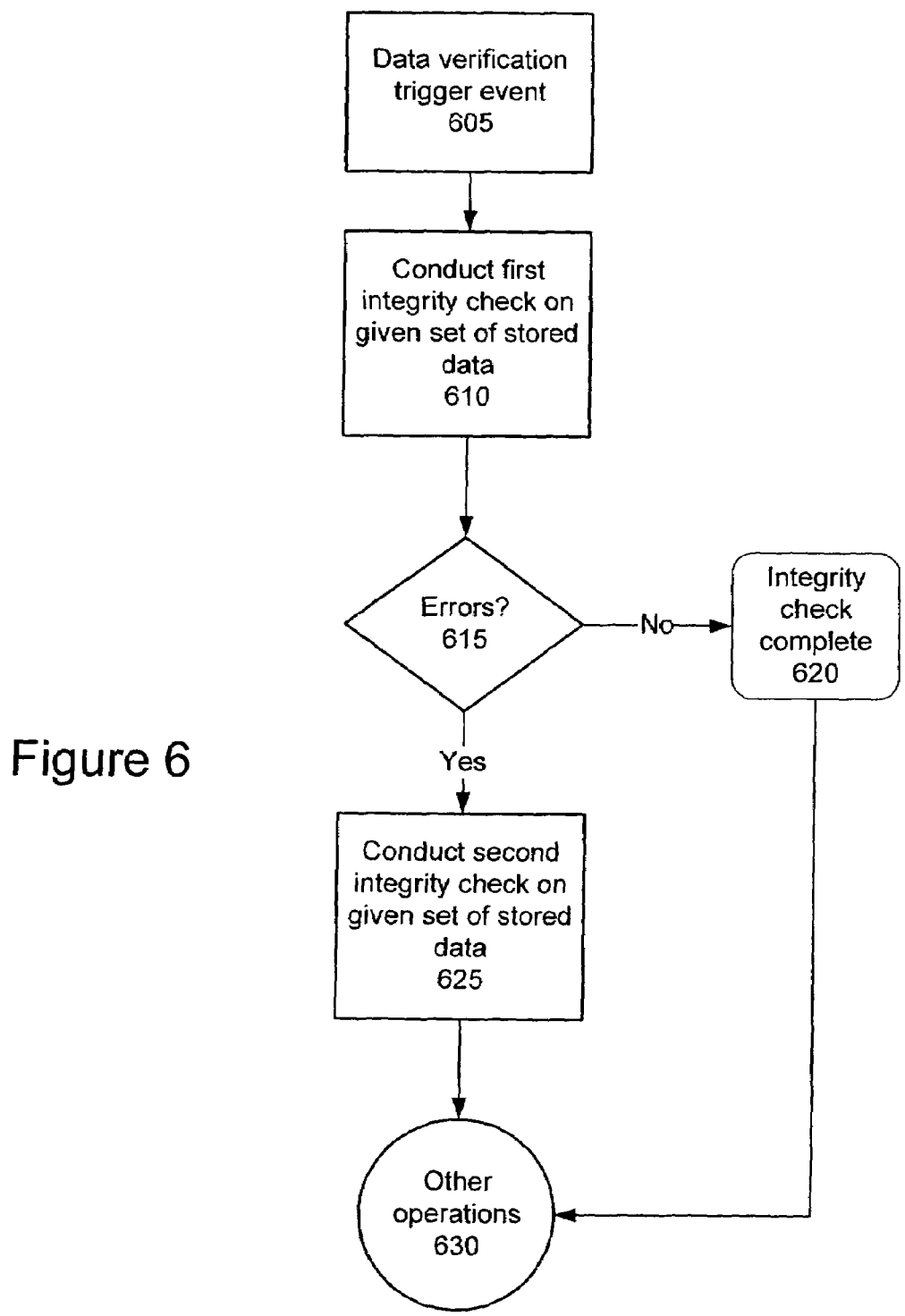
FIG. 6 is a flowchart illustrating one manner of executing a multi-tiered data verification process.

One manner of implementing the data verification software is shown in the flow chart set forth in FIG. 6. As shown, a data verification event is triggered at blocks 605 that initiates the data verification operations. The trigger event may include, for example, a read operation of a given set of stored data, a write operation of a given set of data, a system startup event, periodic and/or random memory checks, etc. At block 610, the data verification software is executed to conduct a first integrity check on the given set the stored data. The type of integrity check performed at block 610 may be chosen so that it is computationally effective to check for errors, but need not rise to the level of a computationally complex integrity check at this point in the verification process. For example, the first integrity check executed at block 610 may be a redundancy check, such as a cyclic redundancy check (CRC). Whether the first integrity check detects one or more errors in the given set of stored data is in operation executed at block 615. If no errors are detected, the integrity check is completed at blocks 620. However, the data verification software proceeds to conduct a second integrity check on the given set of stored data at blocks 625 if the first integrity check detects one or more errors. The second integrity check may be of the type having a higher computational cost than the first integrity check. For example, the second integrity check executed at block 625 may comprise an ECC coding function or the like. Once the second integrity check is completed, the system 10 may proceed with the execution of other operations at block 630.

Figure 7:
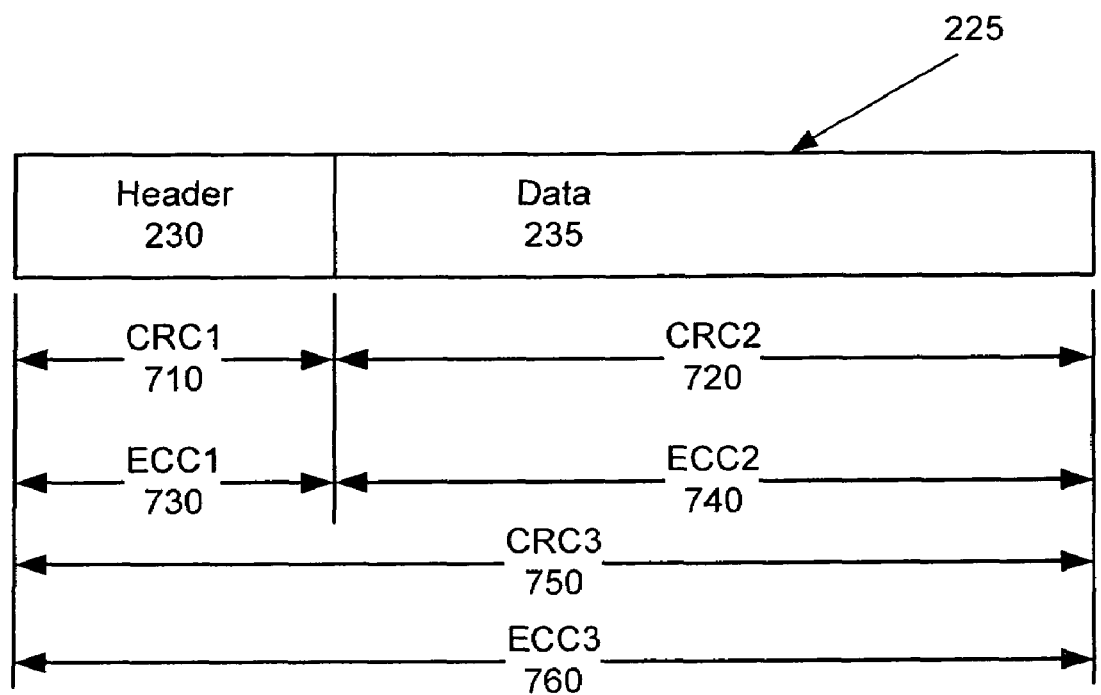
FIG. 7 is a block diagram illustrating the various spans over which error correcting code (ECC) techniques and cyclical redundancy check (CRC) techniques may be applied for a transaction record.

Various ways to logically structure a data record, such as a transaction record 225, for use in a system 10 that employs multi-tiered techniques for data verification operations is shown in FIG. 7. As shown above, the transaction record 225 may include a header section 230 and data section 235. The header section 230 and data section 235 for record 225 may comprise multiple, non-contiguous sections of storage in a flash-like memory device or the like. In this exemplary structure, one or more check values are stored in the header section 230 of the data record. The specific types of check values and the span of the record 225 over which the check values may be calculated are also shown in FIG. 7. As illustrated, a check value CRC1 710 and a corresponding further check value ECC1 730 may be calculated for the header section 230 using a redundancy function and an error correction function, respectively. The resulting values for CRC1 710 and/or ECC1 730 may be stored as check values in the header 230. Alternatively, or in addition, a check value CRC2 720 and a corresponding further check value ECC2 740 may be calculated using a redundancy function and an error correction function, respectively. The resulting values for CRC2 730 and/or ECC 2 740 may be stored as check values in the header 230. Still further, or alternatively, a check value CRC3 750 and a corresponding further check value ECC3 760 may be calculated for the entire record 225 (or over multiple records) using a redundancy function and an error correction function, respectively. The resulting values for CRC3 750 and/or ECC3 760 may be stored as check values in the header 230.

Using separate CRC and/or ECC values for the header section 230 and data section 235 of record 225 may facilitate segregation of errors by the data verification software to a finer granularity, ensuring that errors to meta-information do not corrupt valid data and vice versa. The data verification operations then may use any combination of the generated values 710, 720, 730, 740, 750, and/or 760 to verify data integrity at various points throughout the system. For example, the data verification process may be constructed to initially use only the header section CRC 1 value 710 to verify the integrity of a given record or set of records. This particular implementation may be useful where meta-data is stored in the header section 230 (i.e., the spare area of a flash-like memory) and only the integrity of this meta-information is necessary to respond to the data verification trigger event. Alternatively, multiple values 710, 720, 730, 740, 750, and/or 760 may be used to execute a complete verification of the integrity of the record 225 or set of records. For example, if a redundancy check employing the check value for the header section CRC1 710 determines that there is an error in the content of the header section 230, the header section ECC1 value 730 may be used to further verify the specific location of this error and fix any correctable errors. Using the combination of values in this manner reduces the need for performing costly ECC comparisons in response to every data verification trigger event, and introduces added benefits associated with checks that employ redundancy functions. Similar techniques may be used to verify the integrity of the contents of the data section 235 of one or more records 225, using the respective data section CRC2 720 and ECC2 740 values.

When flash-like memory is used for the memory storage 30, three-byte ECC may be stored as part of the programming or write operation for a sector within the spare area for each 256 bytes of sector data, allowing correction of any single error within the 256 byte segment or detection of any double error within the segment. A separate ECC, which also may be three-bytes may be maintained and associated with the contents of the spare area itself. Exemplary ECC coding functions include the Hamming code, Reed-Solomon code, Reed-Muller code, Binary Golay code, convolutional code, turbo code and the like.

Figure 8:
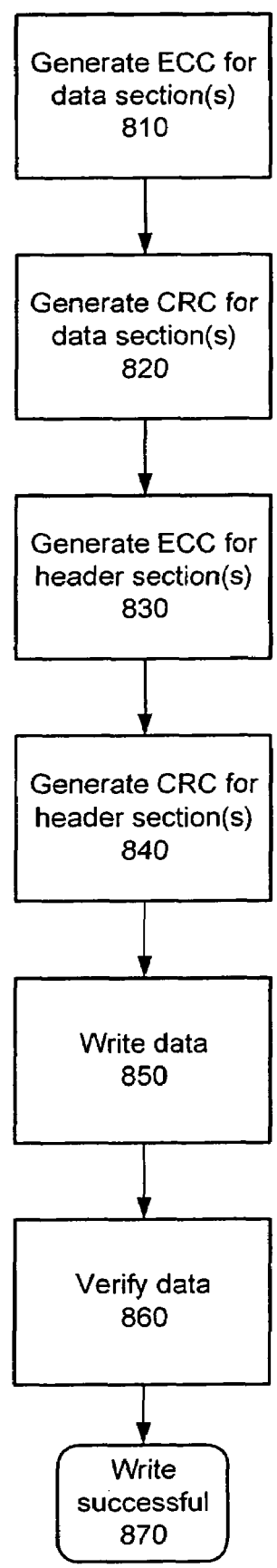
FIG. 8 is a flowchart illustrating an exemplary process for executing a write operation in a system that employs multiple data verification techniques to verify the integrity of the written data.
Figure 9:
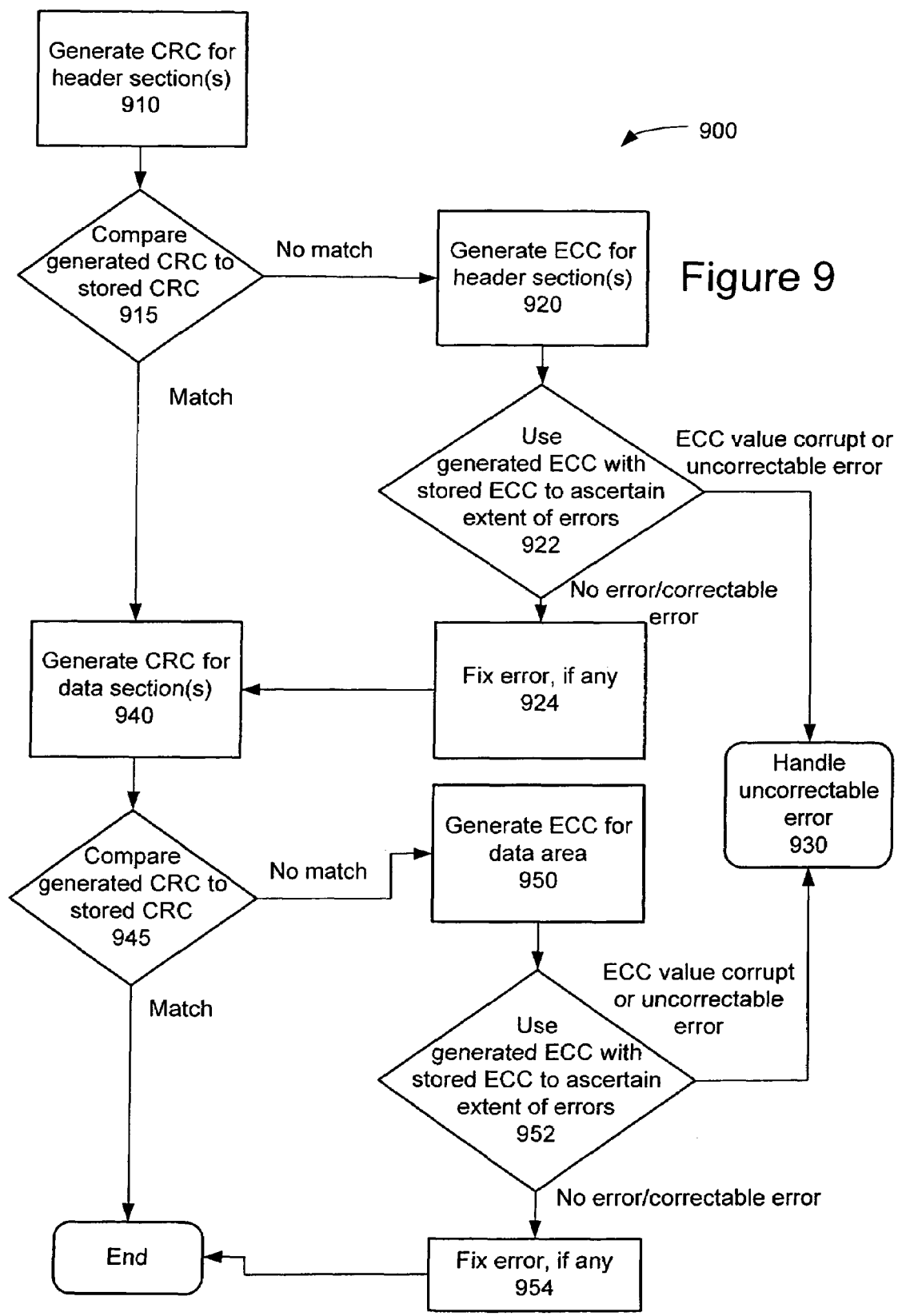
FIG. 9 is a flowchart showing a plurality of interrelated operations that may be used to verify data integrity in a system where the data verification operations employ both CRC and ECC techniques.

FIG. 8 illustrates one manner of writing to memory storage in a system that employs both CRC and ECC techniques to verify data integrity. At block 810, an ECC value for the data area 225 may be generated at block 810. The ECC value may include a single ECC code for the entire data area 225, or multiple ECC codes may be generated for specified subparts of the data area 225. In a flash-like memory device, for example, an ECC code may be generated for every 256 bytes of data area. A CRC value also may be generated for the data area 235 of the record at block 820. The CRC value may include a checksum for the entire data area or subparts of the data area. In a flash-like memory device, a CRC value also may be generated for the entire transaction to which the logical memory page belongs, which may include multiple logical sectors. An ECC value and CRC value also may be generated for the header section at blocks 830 and 840, respectively. The header section of the record and/or the logical page is updated to include the generated check values, and the data and header information are written to memory storage at block 850. At block 860, the integrity of the data that has just been written to memory may be verified before acknowledging the completion of a successful write operation at block 870. It will be recognized, however, that other types of memory storage devices and other combinations of CRC and ECC techniques may be used in lieu of the specific operations shown in FIG. 8.

An exemplary process for performing data verification for a particular unit of data is shown in FIG. 8. The data verification operations 900 may be used to verify data after a write, before a read, during system start up, or at any other time. As illustrated, the system may employ both CRC and ECC techniques to verify data integrity of memory storage, such as a NAND flash memory device. At block 910, a CRC value is calculated using the information stored in the header section of the given record. The generated CRC value is compared to the CRC value previously stored in the header section itself at block 915. If the values match, the data in the header section(s) for the particular unit of data may be considered to be free of errors. If the CRC values do not match one another, the data verification operations proceed to block 920 where the system executes an ECC function that uses the information stored in the header section to generate an ECC value for the header section(s). At block 922, the generated ECC value for the header section(s) is used in conjunction with the ECC value previously stored in the header section itself to, for example, ascertain the extent of the errors, if any, in the header section information. If this operation indicates that either no error or a correctable error exists in the header section information, the error, if any, may be fixed at block 924. If the operation indicates that the header section information includes either an uncorrectable error or that the ECC value itself has become corrupt, an appropriate handler function may be called at block 930.

Alternatively, or in addition, the integrity of the payload of the data section of a particular unit of data may be verified. To this end, a CRC value is generated using the information from the data section(s) of the particular unit of data at block 940. At block 945, this generated value is compared to the CRC value for the data section(s) that is stored in the header section(s). If the values match, the integrity of the data within the data section(s) may be considered free of errors. If the CRC values do not match one another, the data verification operations proceed to block 950 where the system executes an ECC function that uses the information stored in the data section(s) to generate an ECC value for the data section(s). At block 952, the generated ECC value for the data section(s) is used in conjunction with the ECC value for the data section(s) previously stored in the header section to, for example, ascertain the extent of the errors, if any, in the data section information. If this operation indicates that either no error or a correctable error exists in the data section information, the error, if any, may be fixed at block 954. If the operation indicates that the data section information includes either an uncorrectable error or that the ECC value for the data section(s) itself has become corrupt, an appropriate handler function may be called at block 930.

The foregoing techniques may be implemented, for example, to enable the system 100 to quickly and accurately verify the integrity of its data at any point using only the most suitable error correcting techniques. In most instances, the data in memory storage is free of errors. As such, initial use of the more efficient CRC check may be used to eliminate the need to perform more resource intensive ECC analysis. Notwithstanding the use of a redundancy check as the principal error detection technique, the benefits associated with ECC techniques, such as error correction of correctable errors, are readily available when necessary.

Redundancy check functions may be computed more efficiently in software than ECC functions. Various redundancy checks also may be sensitive to the bit positions of errors. The use of a CRC reduces the probability of random errors going undetected, particularly errors of more than two bits within a segment of data, which will go undetected by many ECC techniques.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A computer system comprising:
   a processor;
   a memory storage accessible by the processor;
   a transaction file comprising a plurality of transaction records in the memory storage, each transaction record of the plurality of transaction records comprising a header section and a data section, the header section of each transaction record of the plurality of transaction records including one or more first fields containing a first information corresponding to at least two data check values for verifying the data section of each transaction record of the plurality of transaction records, and one or more second fields containing information corresponding to a file transaction that is represented by each transaction record of the plurality of transaction records, and one or more third fields containing a third information corresponding to at least two header check values for verifying the header section of each transaction record of the plurality of transaction records; and
   data verification software executable by the processor to verify the integrity of one or more transaction records of the plurality of transaction records, where the data verification software is executable to conduct a first integrity check on a given transaction record of the plurality of transaction records using a first data check value of the at least two data check values of the header section of the given transaction record of the plurality of transaction records and, if a first error is detected, to conduct a second integrity check on the given transaction record of the plurality of transaction records using a second data check value of the at least two data check values of the header section of the given transaction record of the plurality of transaction records, and to conduct a third integrity check on the given transaction record of the plurality of transaction records using a first header check value of the at least two header check values of the header section of the given transaction record of the plurality of transaction records and, if a second error is detected, to conduct a fourth integrity check on the given transaction record of the plurality of transaction records using a second header check value of the at least two header check values of the header section of the given transaction record of the plurality of transaction records.

2. The computer system of claim 1, where the second integrity check has a larger computational cost than the first integrity check.

3. The computer system of claim 1, where the third integrity check has a larger computational cost than the fourth integrity check.

4. The computer system of claim 1, where the first integrity check comprises a cyclic redundancy check.

5. The computer system of claim 4, where the cyclic redundancy check comprises:
   generating a cyclic redundancy check value for the given transaction record of the plurality of transaction records; and
   comparing the cyclic redundancy check value to the first data check value of the at least two data check values of the header section of the given transaction record of the plurality of transaction records.

6. The computer system of claim 5, where the second integrity check comprises an error correcting code check.

7. The computer system of claim 6, where one or more correctable errors in the given transaction record of the plurality of transaction records are fixed through an execution of the error correcting code check.

8. The computer system of claim 1, where the second integrity check comprises an error correcting code check.

9. The computer system of claim 1, where the memory storage comprises a flash-like memory.

10. A computer system comprising:
    a processor;
    a memory storage accessible by the processor;
    a transaction file comprising a plurality of transaction records in the memory storage, each transaction record of the plurality of transaction records comprising a header section and a data section, the header section of each transaction record of the plurality of transaction records comprising one or more first fields containing a first information corresponding to at least two header check values for verifying the header section of each transaction record of the plurality of transaction records, and one or more second fields containing a second information corresponding to a file transaction that is represented by each transaction record of the plurality of transaction records;
    data verification software executable by the processor to verify an integrity of one or more transaction records of the plurality of transaction records, where the data verification software is executable to conduct a first integrity check on a given transaction record of the plurality of transaction records using a first header check value of the at least two header check values of the header section of the given transaction record of the plurality of transaction records and, if a first error is detected, to conduct a second integrity check on the given transaction record of the plurality of transaction records using a second header check value of the at least two header check values of the header section of the given transaction record of the plurality of transaction records.

11. The computer system of claim 10, where the header section of each transaction record of the plurality of transaction records further comprises one or more third fields containing a third information corresponding to at least two data check values for verifying the data section of each transaction record of the plurality of transaction records.

12. The computer system of claim 11, where the data verification software is further executable to conduct a third integrity check on the given transaction record of the plurality of transaction records using a first data check value of the at least two data check values of the header section of the given transaction record of the plurality of transaction records and, if a second error is detected, to conduct a fourth integrity check on the given transaction record of the plurality of transaction records using a second data check value of the at least two data check values of the header section of the given transaction record of the plurality of transaction records.

13. The computer system of claim 10, where the second integrity check has a larger computational cost than the first integrity check.

14. The computer system of claim 12, where the third integrity check has a larger computational cost than the fourth integrity check.

15. The computer system of claim 10, where the first integrity check comprises a cyclic redundancy check.

16. The computer system of claim 15, where the cyclic redundancy check comprises:
    generating a cyclic redundancy check value for the given transaction record of the plurality of transaction records; and
    comparing the cyclic redundancy check value to the first header check value of the at least two header check values of the header section of the given transaction record of the plurality of transaction records.

17. The computer system of claim 15, where the second integrity check comprises an error correcting code check.

18. The computer system of claim 10, where the second integrity check comprises an error correcting code check.

19. The computer system of claim 18, where one or more correctable errors in the given transaction record of the plurality of transaction records are fixed through an execution of the error correcting code check.

20. The computer system of claim 10, where the memory storage comprises a flash-like memory.

21. A computer system comprising:
transaction file means for arranging a plurality of transaction records in a memory storage, each transaction record of the plurality of transaction records comprising a header section and a data section, the header section of each transaction record of the plurality of transaction records comprising one or more first fields containing a first information corresponding to at least two data check values for verifying the data section of each transaction record of the plurality of transaction records, one or more second fields containing a second information corresponding to a file transaction that is represented by each transaction record of the plurality of transaction records, and one or more second fields containing a third information corresponding to at least two header check values for verifying the header section of each transaction record of the plurality of transaction records; and
data verification means for conducting a first integrity check on a given transaction record of the plurality of transaction records using a first data check value of the at least two data check values of the header section of the given transaction record of the plurality of transaction records and, if a first error is detected, for conducting a second integrity check on the given transaction record of the plurality of transaction records using a second data check of the at least two data check values of the header section of the given transaction record of the plurality of transaction records, and conducting a third integrity check on the given transaction record of the plurality of transaction records using a first header check value of the at least two header check values of the header section of the given transaction record of the plurality of transaction records and, if a second error is detected, for conducting a fourth integrity check on the given transaction record of the plurality of transaction record using a second header check of the at least two header check values of the header section of the given transaction record of the plurality of transaction records.

22. The computer system of claim 21, where the second integrity check has a larger computational cost than the first integrity check.

23. The computer system of claim 21, where the third integrity check has a larger computational cost than the fourth integrity check.

24. The computer system of claim 21, where the first integrity check comprises a cyclic redundancy check.

25. The computer system of claim 24, where the second integrity check comprises an error correcting code check.

26. The computer system of claim 25, where one or more correctable errors in the given transaction record of the plurality of transaction records are fixed through an execution of the error correcting code check.

27. The computer system of claim 21, where the second integrity check comprises an error correcting code check.

28. The computer system of claim 21, where the memory storage comprises a flash-like memory.

29. A computer system comprising:
transaction file means for arranging a plurality of transaction records in a memory storage, each transaction record of the plurality of transaction records comprising a header section and a data section, the header section of each transaction record of the plurality of transaction records comprising one or more first fields containing a first information corresponding to at least two header check values associated with the header section of each transaction record of the plurality of transaction records, and one or more second fields containing a second information corresponding to a file transaction that is represented by each transaction record of the plurality of transaction records; and
data verification means for conducting a first integrity check on a given transaction record of the plurality of transaction records using a first header check value of the at least two header check values of the header section of the given transaction record of the plurality of transaction records and, if a first error is detected, for conducting a second integrity check on the given transaction record of the plurality of transaction records using a second header check value of the at least two header check values of the header section of the given transaction record of the plurality of transaction records.

30. The computer system of claim 29, where the header section of each transaction record of the plurality of transaction records further comprises one or more third fields containing a third information corresponding to at least two data check values determined from the data section of each transaction record of the plurality of transaction records.

31. The computer system of claim 30, where the data verification means further conducts a third integrity check on the given transaction record of the plurality of transaction records using a first data check value of the at least two data check values of the header section of the given transaction record of the plurality of transaction records and, if a second error is detected, conducts a fourth integrity check on the given transaction record of the plurality of transaction records using a second data check value of the at least two data check values of the header section of the given transaction record of the plurality of transaction records.

32. The computer system of claim 31, where the third integrity check has a larger computational cost than the fourth integrity check.

33. The computer system of claim 29, where the second integrity check has a larger computational cost than the first integrity check.

34. The computer system of claim 29, where the first integrity check comprises a cyclic redundancy check.

35. The computer system of claim 34, where the second integrity check comprises an error correcting code check.

36. The computer system of claim 35, where one or more correctable errors in the given transaction record of the plurality of transaction records are fixed through an execution of the error correcting code check.

37. The computer system of claim 29, where the second integrity check comprises an error correcting code check.

38. The computer system of claim 29, where the memory storage comprises a flash-like memory.

* * * * *